United States Patent [19]
Miller

[11] Patent Number: 4,517,038
[45] Date of Patent: May 14, 1985

[54] METHOD OF REPAIRING BALLISTIC DAMAGE

[76] Inventor: Robert W. Miller, 1235 - 19th St., Hermosa Beach, Calif. 90254

[21] Appl. No.: 553,575

[22] Filed: Nov. 21, 1983

Related U.S. Application Data

[63] Continuation-in-part of Ser. No. 493,323, May 10, 1983.

[51] Int. Cl.³ .............................................. B32B 35/00
[52] U.S. Cl. .................... 156/98; 29/402.11; 156/94; 264/36; 428/63; 428/911
[58] Field of Search ............. 2/2.5; 29/402.09, 402.11; 114/227, 228, 229; 156/94, 98; 264/36; 428/63, 902, 911

[56] References Cited

U.S. PATENT DOCUMENTS

| | | | |
|---|---|---|---|
| 2,692,425 | 10/1954 | Martin | 156/94 X |
| 2,713,210 | 7/1955 | Lobachewski | 29/402.09 X |
| 2,795,523 | 6/1957 | Cobb et al. | 29/402.11 X |
| 2,987,098 | 6/1961 | Daniel | 156/94 X |
| 4,181,768 | 1/1980 | Severin | 428/911 X |
| 4,293,862 | 10/1981 | Beavers | 156/94 X |
| 4,428,998 | 1/1984 | Hawkinson | 428/902 X |

*Primary Examiner*—Robert Dawson
*Attorney, Agent, or Firm*—Michael Bak-Boychuk

[57] ABSTRACT

A method for repairing ballistic impact damage to structural panels of vehicles comprising the steps of cutting out the damaged area in the panel in a preselected size circular cutout, bending a circular patch including an exterior circular metal sheet laminated to a smaller circular interior cloth layer to match the surface convolutions of the panel, impregnating the interior cloth layer with resin and attaching the patch to the panel. In this manner the patch is bent to fit before impregnation and is fixed to the bent shape by fixing the cloth layer.

4 Claims, 4 Drawing Figures

METHOD OF REPAIRING BALLISTIC DAMAGE

CROSS-REFERENCE TO RELATED APPLICATION

This application is a continuation-in-part of my copending patent application Ser. No. 493,323 filed in the U.S. Patent Office May 10, 1983 entitled "IMPROVEMENTS IN BALLISTIC PANELS".

BACKGROUND OF THE INVENTION

1. Field of the Invention

The present invention relates to ballistic protection structures and more particularly to methods of repairing same.

2. Description of the Prior Art

In my prior patent application Ser. No. 493,323 I have described a ballistic panel utilizing layers of aramid cloth bonded with nylon or a similar plastic. Since that time I have found that laminates of this kind can be successfully combined to effect patches in stress carrying panels perforated by projectiles.

In particular, airplane panels in ground support aircraft often are exposed to opposing ground fire with attendant incidents of damage. Typically, this damage results in stress concentrating fractures which, if not repaired, will propagate and grow with use. Airframes characteristically in the interest of conserving weight, include stressed panels which quite often are bonded to honeycomb backing for taking up transverse loads which, when perforated, is damaged beyond practical repair. The present repair sequences typically entail the replacement of i.e. whole structural section, involving an extensive inventory burden and extensive material support. One should particularly note that the incidence of panel damage is not predictable except through statistical considerations and the practice of replacement of whole structural sections will thus dictate a replacement inventory characterized by the number of unique sections in the vehicle serviced. This, of course, is not acceptable in field applications and solutions to this problem have been sought in the past.

Stressed structures are typically characterized by a panel structure convolved to a geometry dictated by external considerations, like air flow or operating function, the panel being bonded on the interior to stiffening elements often taking the form of thin walled honeycomb. On projectile perforation both the honeycomb backing and the panel are damaged and any repair to the panel necessarily includes some repair or replacement of the loaded backing.

While structures of this kind may be repaired with stiff patches bridging the damaged area, once again, a rather wide complement of variously bent patches is necessary for mating with all the potentially damaged surfaces. Accordingly, repair techniques by which the patch is first formed to fit the shape of the damaged panel and thereafter rendered stiff is both desired and convenient under the foregoing exigencies. It is one such technique that is disclosed herein.

SUMMARY OF THE INVENTION

Accordingly, it is the general purpose and object of the present invention to provide a method of repairing stressed panels convenient in the field.

Other objects of the invention are to provide a method of repairing panels utilizing standardized patch configurations.

Yet further objects of the invention are to provide a method of repairing uniquely convolved structures with standardized parts.

Briefly, these and other objects are accomplished within the present invention by way of a method utilizing sheet metal patches of various standardized circular planforms each having bonded to one side thereof a concentric, circular stack of layers of aramid cloth which may be sandwiched and interleaved between thin film nylon panels. This sandwiched arrangement may then be heated at pressure to fuse the aramid filaments with the nylon sheets and to adhere the sandwiched stack to the sheet metal patch. As result of this process a high compliance composite stack is formed on one side of the patch, of a circular planform smaller than the patch to expose a peripheral strip around the patch for attachment to the damaged panel. Because of the compliance of the stack the patch is easily bent to the geometry of the panel. Concurrently a circular hole equal or just greater than the stack diameter is cut in the panel, cutting out all the damaged structure including any stress concentration fractures that may eventually cause fracture propagation. The patch is then fitted and bent to conform to the panel and once a good fit is achieved the exterior cloth plies of the stack are impregnated with resin which thus renders the patch rigid. This hardened patch can then be used to bridge any damaged stiffening structure to effect a repair.

DESCRIPTION OF THE PREFERRED PROCESS

Figure 1:
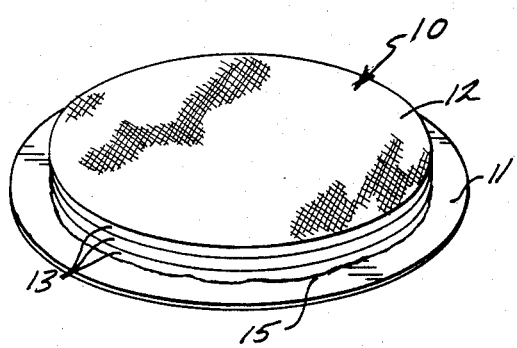
FIG. 1 is a perspective illustration of a patch constructed according to the present invention.

As shown in FIG. 1 the inventive repair process utilizes circular, or otherwise shaped, patch assemblies generally designated by the numeral 10, characterized by a sheet metal backing plate or skin 11 of a plan form larger than the plan form of a stack 12 compliantly bonded thereto. Stack 12 may comprise a plurality of layers of filament cloth 13 preferably of high tensile properties like those provided in aramid fiber, glass fiber or carbon fiber, the layers 13 being loosely adhered to each other through any high compliance adhesion or bonding process, exemplified by the process taught in my copending application Ser. No. 493,323 filed on May 10, 1983. In this form a rather flexible patch configuration is achieved which can be bent to any surface convolution by manually bending the skin 11.

Figure 2:
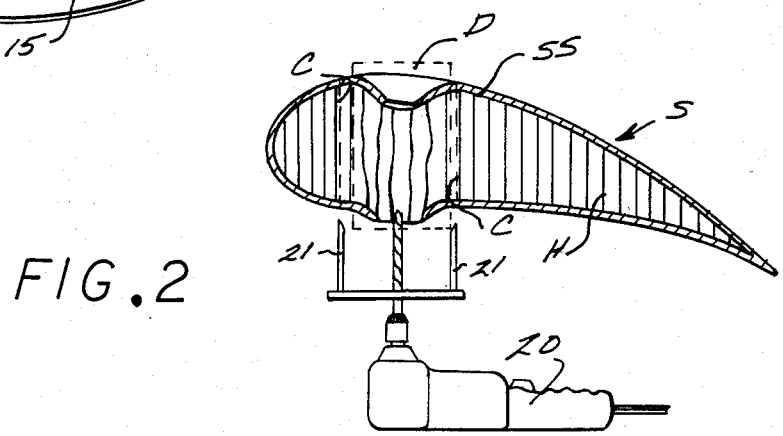
FIG. 2 is a sectional illustration of a damaged structure prepared for patching.
Figure 3:
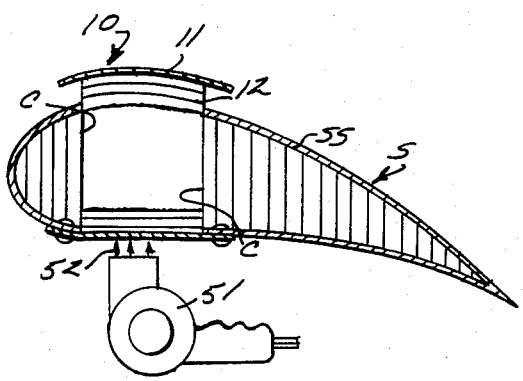
FIG. 3 is a sectional illustration of a damaged structure with patches bent for fit therewith and attached thereto.

A stress carrying structure shown in FIG. 2 and characterized by a skin SS bonded or attached to a stiffening backing shown by way of an interior honeycomb H when damaged by a projectile will include damage in the area D involving both the skin SS and the stiffening backing H. This damage is characterized by tears and fractures known to those in the art to form stress concentrations which on subsequent loading may cause further propagation and failure. Thus any repair will necessarily entail the removal of the bent and torn edges to develop a smooth edge like that achieved by a hole cutter assembly 20. More specifically, when effecting field repairs in accordance with the present method the repairman will select a hole diameter conformed to receive the stack 12 by setting the blades 21 of the hole cutter assembly 20. A cut is then made along lines C extending both through the skin SS and the stiffening backing H. Thereafter the repairman will select the appropriately sized patch assembly 10, namely bending the skin 11 thereof to a shape conforming to the adjacent structural surface, as shown in FIG. 3. Thereafter, the exposed plies of the stack 12 may be coated with resin shown as a resin coat 16 which may extend onto the peripheral strip 15 about the stack 12 to improve the bonding of the patch to the damaged structure. The patch thus coated is then placed onto the damaged area with the stack 12 extending into the opening cut. Thereafter the peripheral strip 15 in the skin 11 may be blind, riveted or otherwise attached (shown by rivets 18) to the skin SS and the resin on the patch is then allowed to cure.

Figure 4:
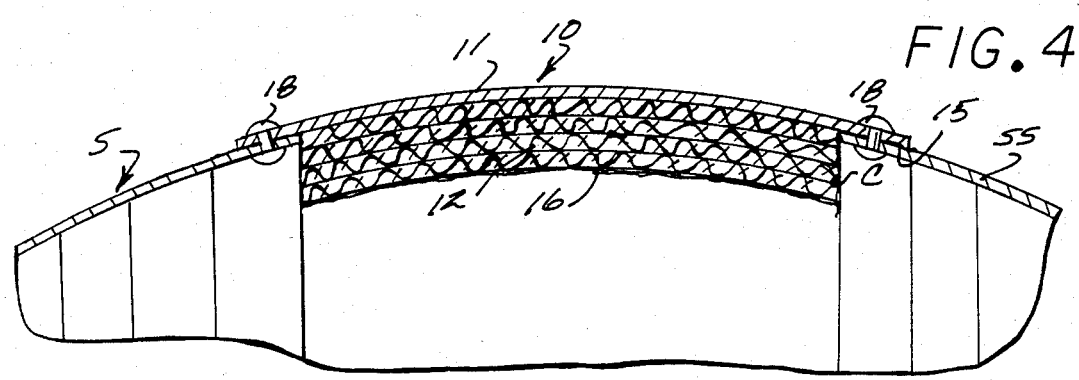
FIG. 4 is a side view of an inventive patch including impregnating resin coat for the stiffening thereof.

The resulting repair, exemplified in FIG. 4, then includes exterior layers of the stack 12 impregnated with the cured resin 16 bridging the gap across the cut C with a high sectional area moment of inertia structure. This bridging then carries any loads previously carried by the stiffening backing H across the damaged area.

Alternatively, layers 13 may be impregnated with what is commonly referred to as B stage resin and upon placement and attachment may be fully cured through the application of heat to the patch. This is illustrated in the lower part of FIG. 3 by way of a heater assembly 51 directing a stream of heated air 52 at the patch 10. Those skilled in the art should appreciate that B stage resins are variously available in the market, as epoxy, polyester, or phenol formaldehyde, the latter having had the intermediate stage of cross linking as taught in U.S. Pat. No. 942,852 to Baekeland. These B-stage or intermediate polymer linkages are then further crosslinked and hardened to the final state upon the application of heat.

It should be noted that the foregoing process entails only a limited complement of patch sizes and thus represents a small inventory investment. Moreover, the repair is easily effected in the field with simple hand tools and little complexity.

Obviously many modifications and changes may be made to the foregoing description without departing from the spirit of the invention. It is therefore intended that the scope of the invention be determined solely on the claims appended hereto.

What is claimed is:

1. A method for making repairs in a stressed panel, comprising the steps of:
   cutting out preselected openings in said panel;
   selecting a patch assembly having an exterior metal skin larger than said opening adhered to a stack of filament layers of a plan form substantially equal to said opening;
   bending said skin to match the surface of said panel adjacent said opening;
   coating said filament layers with resin; and
   attaching said patch assembly to the edges of said opening.

2. A method according to claim 1 wherein:
   said skin of said patch assembly comprises a circular metal structure and said filament layers comprise a circular stack concentrically adhered to said metal structure.

3. A method according to claim 2 wherein:
   said filament layers include layers of filament cloth.

4. A method according to claim 3 wherein:
   said filament cloth includes aramid filaments.

* * * * *